(12) United States Patent
Günther (10) Patent No.: US 11,177,526 B2
(45) Date of Patent: Nov. 16, 2021

(54) BATTERY HOUSING AND METHOD FOR PRODUCING SAME

(71) Applicant: Kirchhoff Automotive Deutschland GmbH, Attendorn (DE)

(72) Inventor: Alexander Günther, Olpe (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 186 days.

(21) Appl. No.: 16/473,996

(22) PCT Filed: Feb. 28, 2018

(86) PCT No.: PCT/EP2018/054974
§ 371 (c)(1),
(2) Date: Jun. 26, 2019

(87) PCT Pub. No.: WO2018/158340
PCT Pub. Date: Sep. 7, 2018

(65) Prior Publication Data
US 2020/0295322 A1    Sep. 17, 2020

(30) Foreign Application Priority Data

Mar. 2, 2017   (DE) .......................... 102017104359.4

(51) Int. Cl.
*B60K 1/00*     (2006.01)
*H01M 50/20*    (2021.01)
(Continued)

(52) U.S. Cl.
CPC .............. *H01M 50/20* (2021.01); *B60K 1/04* (2013.01); *B60L 50/50* (2019.02); *B60L 50/64* (2019.02);
(Continued)

(58) Field of Classification Search
CPC .. H01M 50/20; H01M 10/625; H01M 50/502; B60L 50/50; B60L 50/04; B60K 1/04
See application file for complete search history.

(56) References Cited

U.S. PATENT DOCUMENTS 5,736,272 A    4/1998  Veentra et al.
6,837,019 B2 *  1/2005  Collie .................... E04B 7/063
                                           52/489.1
(Continued)

FOREIGN PATENT DOCUMENTS

DE    102013204765 A1    9/2014
DE    102015006297 A1    11/2016
(Continued)

OTHER PUBLICATIONS

International Search Report dated Sep. 7, 2018 in parent International application PCT/EP2018/054974.
(Continued)

*Primary Examiner* — Hau V Phan
(74) *Attorney, Agent, or Firm* — Polson Intellectual Property Law, PC; Margaret Polson; Christopher Sylvain (57) ABSTRACT

A battery housing for a vehicle driven by an electric motor comprises a housing part and a cover part for closing the housing part. A trough-like structure of the housing part is formed by a peripheral wall and a base. A compartment structure, formed by at least one longitudinal strut and at least one transverse strut connected to the longitudinal strut, for holding battery modules is inserted into the trough-like structure. The compartment structure comprises tolerance-compensating elements for compensating tolerances of the struts and/or of the internal dimensions of the trough-like structure. A tolerance-compensating element having a longitudinal strut seat and a transverse strut seat is involved in a node formation between the transverse strut and the longitudinal strut, such that the longitudinal strut seat and
(Continued)

the transverse strut seat are bordered by two connecting extensions spaced from one another, each of which engages a corner of the respective node between the transverse strut and the longitudinal strut. The connecting extensions are formed on a connecting plate which acts as a cover support element. Each connecting extension is connected to a lateral face of the longitudinal strut and to a lateral face of a transverse strut by a joining process. A method for fitting tolerance-compensating elements during the production of a battery housing is also described.

21 Claims, 5 Drawing Sheets (51) Int. Cl.
B60K 1/04 (2019.01)
B60L 50/64 (2019.01)
B60L 50/50 (2019.01)
B65D 25/04 (2006.01)

(52) U.S. Cl.
CPC ......... B65D 25/04 (2013.01); *H01M 2220/20* (2013.01)

(56) References Cited

U.S. PATENT DOCUMENTS

| 6,905,109 | B2* | 6/2005 | Mills ................... E04H 17/1413 256/65.02 |
| 7,077,704 | B2* | 7/2006 | Ikeda ................... H01R 11/283 439/627 |
| 7,614,195 | B2* | 11/2009 | Platt ........................ E04B 9/064 52/506.06 |
| 7,770,349 | B2* | 8/2010 | Tedesco ................. E04B 9/122 52/506.08 |
| 7,854,472 | B2* | 12/2010 | Gomi ................. B62D 25/2036 296/193.07 |
| 8,966,857 | B2* | 3/2015 | Pope ..................... E04B 1/2604 52/696 |
| 9,065,103 | B2 | 6/2015 | Straubel et al. |
| 9,209,268 | B2* | 12/2015 | Wu ................... H01L 21/76843 |
| 10,424,770 | B2 | 9/2019 | Günther |
| 2012/0094164 | A1* | 4/2012 | Wuensche .......... H01M 50/209 429/100 |
| 2012/0219839 | A1* | 8/2012 | Kritzer ................ H01M 10/625 429/120 |
| 2012/0297724 | A1 | 11/2012 | Pope et al. |
| 2014/0227576 | A1* | 8/2014 | Meintschel ......... H01M 50/502 429/120 |
| 2014/0322582 | A1* | 10/2014 | Ruter .................... H01M 50/20 429/120 |
| 2018/0105062 | A1* | 4/2018 | Fees .................. H01M 50/502 |
| 2018/0108891 | A1* | 4/2018 | Fees .................... H01M 50/24 |
| 2019/0036092 | A1 | 1/2019 | Günther |
| 2019/0058174 | A1* | 2/2019 | Nierescher .......... H01M 50/502 |
| 2019/0229311 | A1 | 7/2019 | Günther |
| 2019/0252741 | A1 | 8/2019 | Günther |
| 2019/0259994 | A1 | 8/2019 | Günther |
| 2019/0273231 | A1 | 9/2019 | Günther |
| 2019/0337402 | A1 | 11/2019 | Günther |
| 2019/0381899 | A1 | 12/2019 | Günther |

FOREIGN PATENT DOCUMENTS

| DE | 102015111749 A1 | 1/2017 |
| FR | 1073514 A | 9/1954 |
| JP | 2015117055 A | 6/2015 |

OTHER PUBLICATIONS

International Preliminary Report on Patentability, Chapter II, dated Mar. 6, 2019 in parent International application PCT/EP2018/054974.

Office Action dated Jul. 26, 2021 in related Chinese application 201880012609.7.

* cited by examiner

BATTERY HOUSING AND METHOD FOR PRODUCING SAME

BACKGROUND

The present disclosure relates to a battery housing for a vehicle driven by an electric motor with a housing part and a cover part for closing the housing part, wherein a trough-like structure of the housing part is formed by a peripheral inner wall and a base interconnecting the wall, wherein a compartment structure, formed by at least one longitudinal strut and at least one transverse strut connected to the longitudinal strut to form a node, for holding battery modules is inserted into the trough-like structure, and wherein the compartment structure features tolerance-compensating elements for compensating the tolerances of the struts and/or of the internal dimensions of the trough-like structure. The present disclosure further relates to a tolerance-compensating element for such a battery housing and to a method for fitting the tolerance-compensating elements during the production of such a battery housing.

In vehicles driven by an electric motor, such as passenger vehicles, trucks, forklifts, et cetera, battery modules are used as power storage. Such battery modules typically consist of a plurality individual rechargeable batteries. These batteries are usually high-voltage batteries. A battery module may have one or multiple batteries. The housing of battery modules needed for the operation of such vehicles must meet certain requirements. This includes the response of such a battery housing in the event of a collision, also known as crash performance, as well as the weight. Furthermore, the goal is to make the production of such a battery housing as simple as possible.

Such battery housings are generally produced from metal components, for instance from aluminum or steel structures, although there are also battery housings that are made out of different metals. In order to accommodate the necessary number of battery modules, such battery housings may, have rather large dimensions. They are typically accommodated in the floor area of the vehicle. Battery housings with dimensions of 2.0 m×1.5 in are not uncommon. For such large components, compliance with tolerances is a particular challenge.

Such a battery housing comprises a trough-like housing part, which may can be provided, for instance, by a frame or a frame structure and a base attached thereto, or by a correspondingly deep-drawn or canted component. A compartment structure is inserted into the trough-like structure of the housing part in order to subdivide it into compartments. Each compartment is typically used to hold a battery module. Such a compartment structure is formed by providing at least one longitudinal strut that extends parallel to one edge of the trough-like structure, which longitudinal strut is attached with its respective ends to the inner walls of the trough-like structure. For further subdivision, multiple parallel transverse struts are provided, each arranged at a distance from each other, wherein two transverse struts are arranged opposite each other with respect to the longitudinal axis of the longitudinal strut. The transverse struts are attached with one end face to a lateral face of the longitudinal strut, and with their other end face to the interior wall of the trough-like structure or to another longitudinal strut. The struts are connected to one another and to the interior wall of the trough-like structure of the housing part by a joining process, these connections typically being welded joints.

DE 10 2013 204 765 A1 discloses a battery housing for a motor vehicle with a trough-like housing part, consisting of side walls and a bottom wall, with an upper wall serving as cover part. In the trough-like housing part, partition walls are arranged as transverse struts, and a longitudinal wall is arranged as a longitudinal strut.

DE 10 2015 111 749 A1 discloses a battery housing with a construction that is similar in principle, having a trough-like housing part and a compartment structure consisting of longitudinal members as a longitudinal strut and transverse members as a transverse strut. In these previously, known battery housings, no tolerance compensation is provided.

Due to the aforementioned size of such battery housings, tolerance-compensating elements must be integrated into the structure of the compartment structure for the compensation of longitudinal tolerances in particular. These elements are inserted between the end faces of the struts and the interior wall of the trough-like structure. The transverse struts are welded with their other end face to the respective lateral longitudinal strut facing this end face. Since the longitudinal strut extends through the entire trough-like structure, only one compensation element is needed for tolerance compensation. Furthermore, due to the size of the battery housings, cover support elements are positioned on the upper surface of the longitudinal strut in order to prevent the cover from sagging due to its relatively large span. Such cover support elements can also be arranged on the transverse struts. The provision of such cover support elements is necessary, since generally, electric cables are guided along the surfaces of the struts that face the cover, and damage to these cables as a result of a sagging cover should be avoided. Such a compartment structure is manufactured separately from the first housing part. Upon completion of the compartment structure, it is inserted into the trough-like structure intermediary tolerance-compensating elements at the ends of the struts, and welded to it.

A disadvantage of such a battery housing is the high number of parts that must be handled. Furthermore, since the weight of such a battery housing should be as low as possible, it would also be desirable if such a battery housing could in principle be designed with a lighter construction.

Proceeding from the above prior art, an aspect of the present disclosure is therefore to further develop a battery housing of the aforementioned type, such that not only is its production simplified, but also such that its weight can be reduced in principle.

SUMMARY

According to the present disclosure, the above aspect is provided by a battery housing of the type mentioned at the beginning, wherein a tolerance-compensating element with a longitudinal strut seat and a transverse strut seat is involved in the node formation between a transverse strut and a longitudinal strut, wherein the longitudinal strut seat and the transverse strut seat are each bordered by two respective connecting extensions of the tolerance-compensating element mutually spaced apart from one another, each of which engaging a corner of the respective node between the transverse strut and the longitudinal strut, said connecting extensions formed on a connecting plate which acts as a cover support element, and each of which being connected to a lateral face of the longitudinal strut and to a lateral face of a transverse strut by a joining process.

In this battery housing, a tolerance-compensating element is involved in the node formation between a longitudinal strut and at least one transverse strut. Tolerance compensation of the transverse struts takes place in this battery housing with respect to the longitudinal strut, and therefore within the area of the node forming between the longitudinal strut and the transverse strut. The involvement of tolerance-compensating elements between the end faces of the transverse struts and the interior wall of the trough-like structure is therefore no longer necessary. An advantage of the inclusion of the tolerance compensation in the node formation in an embodiment in which two transverse struts are arranged opposite one another with respect to the longitudinal axis of the longitudinal strut, which is typically the case, is that tolerance compensation is provided for both transverse struts by a single tolerance-compensating element. Therefore, in this battery housing, a node is only formed by the tolerance-compensating element, since the connection between a transverse strut and a longitudinal strut is not made directly, but rather via the respective tolerance-compensating element.

A tolerance-compensating element according to the present disclosure comprises a longitudinal strut seat and a transverse strut seat. The longitudinal strut seat and the transverse strut seat are each provided by two connecting extensions that are mutually spaced from each other, respectively engaging a corner between the transverse strut and the longitudinal strut, formed directly or indirectly on a connecting plate. With these connecting extensions, each connecting extension is attached to a lateral face of the transverse strut and to a lateral face of the longitudinal strut, for instance by a joining process. Typically, such a tolerance-compensating element is a sheet metal part, produced from steel plate. A tolerance-compensating element of this type may also be connected to the struts inserted into the strut seats by other joining techniques, such as gluing. The tolerance-compensating element may certainly also be made from a different material, for instance as a die-cast zinc part or from a synthetic material, in particular a fiber-reinforced plastic component.

The tolerance compensation of the transverse struts relative to the longitudinal strut is provided via the connecting extensions bordering a transverse strut seat. These are designed so that the connecting joint is possible between a connecting extension and a side wall of a transverse strut at a certain distance from the adjacent side will of the longitudinal strut. This may be accomplished, for instance, with connecting extensions having flanges in the area in which the transverse strut seat is bordered, such that the width of the flange not only bridges the maximum remaining air gap between a transverse strut and a longitudinal strut, but also overlaps to a certain degree with the adjacent side wall of the transverse strut.

The width clearance of the strut seats of such a tolerance-compensating element are adjusted to the widths of the inserted struts. It may be provided that the width clearance of the strut seats correspond to the width of the inserted struts. It is also possible for the width clearance to be slightly smaller than the width of the inserted struts in order to achieve clamping as a way to pre-fixate a longitudinal strut and the at least one transverse strut involved in a node formation. For such a purposes, it is deemed to be sufficient when such clamping is not over the entire height of a strut seat, but only in the area of the lower end portion of the connecting extensions.

In a further development, the connecting plate of such a tolerance-compensating element is a cover support element. In this case, the tolerance-compensating element also serves to support a cover. In a preferred embodiment, the connecting plate also serves to connect the cover, such that it can be considered a cover connecting plate. The tolerance elements can also be understood as cover connectors, in particular those located in the covered interior of the trough. In such an embodiment, it may be advantageous for the width clearance of the longitudinal strut seat and that of the transverse strut seat be somewhat greater than the width of the inserted struts. In which case, tolerance compensation may also be provided with respect to the intended, defined positioning of the tolerance-compensating elements within the trough-like structure. A tolerance-compensating element could then be kept in the area of a node exactly in the desired cover-connecting position in which the cover-connecting points must be positioned, and be attached in that position to the struts, for instance by welding. In the event that such a tolerance-compensating element s to be joined with the struts, the width clearance of the two strut seats is dimensioned for a remaining maximum gap width between the connecting extension and the adjacent strut, such that the desired joining process can still be performed. In the welding of sheet metal components, two parts can be joined if a gap width between the joined elements is not more than approx. 1 mm. This possible gap size is deemed to be more than sufficient in order to compensate the tolerances occurring when manufacturing the trough-like structure and the struts. In fact, the tolerance compensation for the positioning of the cover-connecting points, as made possible by this concept, is so large that the trough-like structure and/or the struts can even be produced with a lower tolerance requirement for size accuracy. This also has a cost-reducing effect on the manufacturing process.

The connecting extensions of the tolerance-compensating element feature in at least one plane a planar extension running parallel or almost parallel to the lateral face of an adjacent strut. The end portion of a transverse strut is inserted between two connecting extensions whose flanges run parallel, thus bordering a transverse strut seat. The width of the flanges therefore specifies the possible longitudinal compensation. The length of a transverse strut is typically dimensioned such that, despite a transverse strut's engagement in the transverse strut seat with the maximum length permitted within the tolerance, there still remains a small air gap between its one end face and the lateral face of the longitudinal strut facing it when this transverse strut is attached with its other end face to the interior wall of the trough-like structure. In a possible implementation, the length of the transverse struts is dimensioned such that when they abut the interior wall of the trough-like structure with their one end face, a certain air gap remains between the other end face and the side wall of the longitudinal strut. This serves the purpose that the transverse struts are deliberately provided somewhat shorter in order to prevent theta from canting when they are inserted into the trough-like structure. Such an air gap can be easily bridged due to the node formation with participation of the tolerance-compensation element. In a further development, it is provided for the connecting extensions to have, in addition to this flange, a second flange at an angle to the first flange running parallel or almost parallel to the adjacent lateral face of the longitudinal member. The flanges bordering a strut seat may be positioned at an inclination, such that the strut seat widens from its outer mouth toward the center of the tolerance-compensating element. Typically, the tolerance-compensating elements are made out of a somewhat elastic material, so that this flexible material property can be positioned in the plane of the trough-like structure (x-y direction) when the tolerance-compensating elements are mounted onto the struts involved in the node formation, and the ends of the flanges abut the side faces of the inserted strut, even with the possibility of the aforementioned tolerance compensation. In this embodiment too, the struts inserted into the strut seats are pre-fixated therein with a certain clamping.

If the connecting plate is provided as cover connecting plate, it typically has a fastening element, for instance a pierce nut, into which a screw extending through the cover can be screwed in order to fasten the cover. Since the connecting plate of the tolerance-compensating element is located above the upper surface of a strut, the engagement of a screw shaft there does not negatively affect the usable volume of the battery housing for accommodating the battery modules.

Such a tolerance-compensating element may be produced as a sheet metal part, as previously mentioned. This can then be particularly cost-effective to manufacture. In an advantageous embodiment, the connecting extensions are not formed directly on the connecting plate. Rather, two shanks are provided on the connecting plate at an angle facing each other, with the connecting extensions being formed on then in turn. The height of the shanks here defines the minimum distance between the interior side of the cover and the upper surface of the compartment structure.

In addition to the floating positioning of such a tolerance-compensating element in the x-y plane of the housing part, the positioning of the tolerance-compensating element may also be kept with respect to the distance of the connecting plate from the upper surface of the longitudinal strut, until the tolerance-compensating element is attached to the struts. This also allows for tolerance compensation with respect to the height (z dimension) of the compartment structure. For this purpose, the length of the connecting extensions is designed such that their height is less than the height of the struts, and therefore they are not supported on the base of the trough-like structure.

BRIEF DESCRIPTION OF THE DRAWINGS

The present disclosure is described below using example embodiments with reference to the enclosed figures, wherein.

DETAIL DESCRIPTION

Figure 1:
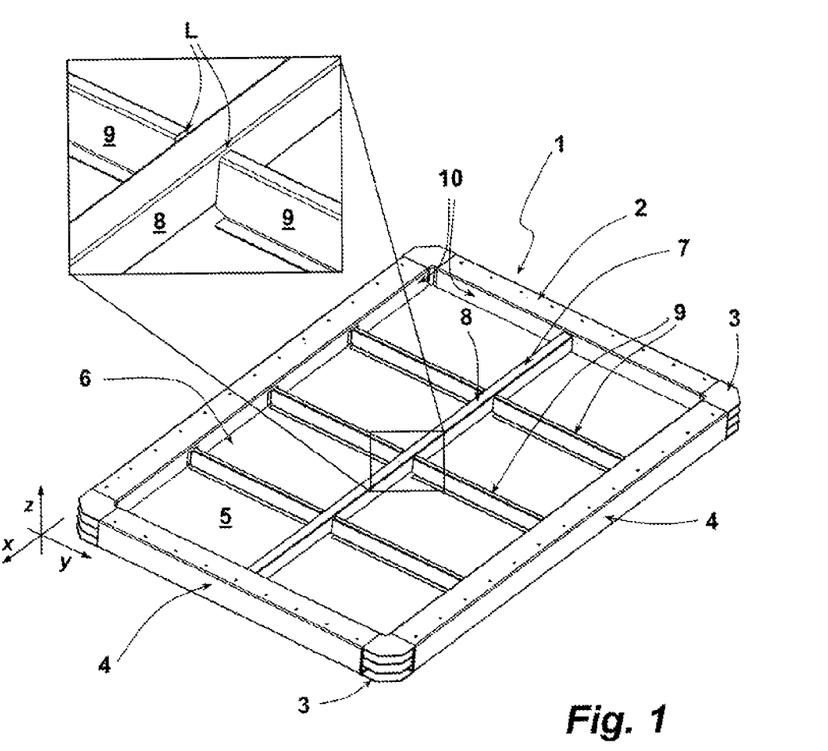
FIG. 1 shows a perspective view of a housing part of a battery housing with its cover removed, in a preassembled state.

With reference to FIG. 1, a housing part 1 of a battery housing serves for receiving individual battery modules, not shown in the figures. The housing part 1 comprises a frame 2, which in turn is formed of multiple profile segments 4 mutually connected by angle pieces 3, and a bottom plate 5 inserted into the lower frame opening. The frame 2 and the bottom plate 5 form a trough-like structure 6 for holding battery modules. Such a trough-like structure 6 may also be provided by a deep-drawn or canted component. The trough-like structure 6 is subdivided into individual compartments by a compartment structure 7. In the embodiment shown, the compartment structure 7 comprises a longitudinal strut 8 and multiple transverse struts 9, wherein two respective transverse struts 9 are arranged opposite each other along the longitudinal axis of the longitudinal strut 8. In total, the illustrated embodiment provides for six transverse struts 9. In the longitudinal dimension of the longitudinal strut 8, three sets of transverse struts, each formed of two transverse struts 9, are arranged at distance from one another and parallel to one another. The end face of the longitudinal strut 8 is attached to the interior wall 10 of the trough-like structure 6 or of the frame 2. On one end of the longitudinal strut 9, this is done through an intermediary compensation element for longitudinal compensation. The intermediary compensation element is located on the closer interior wall of the frame 2 in the depicted embodiment, and is therefore not visible in the figures. The transverse struts 9 are attached at one end directly to the interior wall 10, and to the bottom plate 5 by means of two bottom flanges placed at an angle into the plane of the bottom plate 5. In the illustrated embodiment, the aforementioned connection of the struts 8, 9 to the frame 2 or to the bottom plate 5 is done by way of spot welding. In the illustrated embodiment, the components involved in the structure of the housing part 1 are all sheet metal components. A connection of the struts 9 with the bottom plate 5 and with the interior wall 10 may also be formed in a different manner, for instance by other joining processes or by gluing or by means of mechanical connecting elements. In the illustrated embodiment, the two-dimensional extension of the housing part 1 is approx. 2 m×1.5 m.

The compartment structure 7 shown in FIG. 1 is not yet completed. Between the end faces of the transverse struts 9 that face the longitudinal strut 8 and the longitudinal strut 8 itself, there is an air gap L, as can be clearly seen in the enlarged detail of this figure. Depending on the tolerance accuracy of the length of the transverse struts 9 or of the interior width of the trough-like structure 6 or of the width of the longitudinal strut 8, this remaining air gap L may have different respective widths.

In order to complete the compartment structure 7, the transverse struts 9 are connected with the longitudinal strut 8 to jointly form a node. For this purpose, a number of tolerance-compensating elements 11 corresponding to the number of the nodes are inserted, which in the present case is three. Such a tolerance-compensating element 11 is shown in perspective alone in FIG. 2.

The tolerance-compensating element 11 is provided as a stamped and shaped sheet metal part, and comprises a cover connecting plate 12. This plate 12 runs transverse to the longitudinal dimension of the longitudinal strut 8, or respectively, in the longitudinal dimension of the transverse struts 9. Parallel to the longitudinal dimension of the transverse struts 9, two shanks 13, 13.1 are positioned at an angle on the connecting plate 12. On each shank, two connecting extensions are formed at a distance from each other. For purposes of clarity, only one connecting extension is shown marked with reference numeral 14 in FIG. 2. The connecting extensions 14 are all designed the same. The following explanation of the connecting extension 14 therefore applies equally to the other ones. In the illustrated embodiment, the distance between the shanks 13, 13.1, and therefore between two parallel connecting extensions 14, is a certain gap size greater than the width of the transverse struts 9 extending in the longitudinal dimension of the longitudinal strut 8. The connecting extensions 14 of the shanks 13, 13.1 arranged at such a distance from one another form a transverse strut seat 15. The end portions of the mutually facing transverse struts 9 engage these strut seats 15, while leaving a certain amount of play. The two connecting extensions 14 of a respective shank 13, 13.1 also provide a longitudinal strut seat 16. Its width dimension is such that the longitudinal strut 8 can also be inserted into the strut seat 16 with some play in terms of its width. The gap width allowing for this play is dimensioned such that the respective tolerance compensation element 11 can be positioned in the plane of the trough-like structure 6 (the x-y plane), but also such that, despite the gap width between the joining partners, the connecting extensions 14 can be connected by joining, in particular by spot welding, respectively to a lateral face of the longitudinal strut 8 and to those of a transverse strut 9. This play in the x-y direction allows for an exact positioning of the tolerance-compensating elements 11 within the trough-like structure 6 regardless of the exact position struts 8, 9 that are to be combined into a node.

Figure 2:
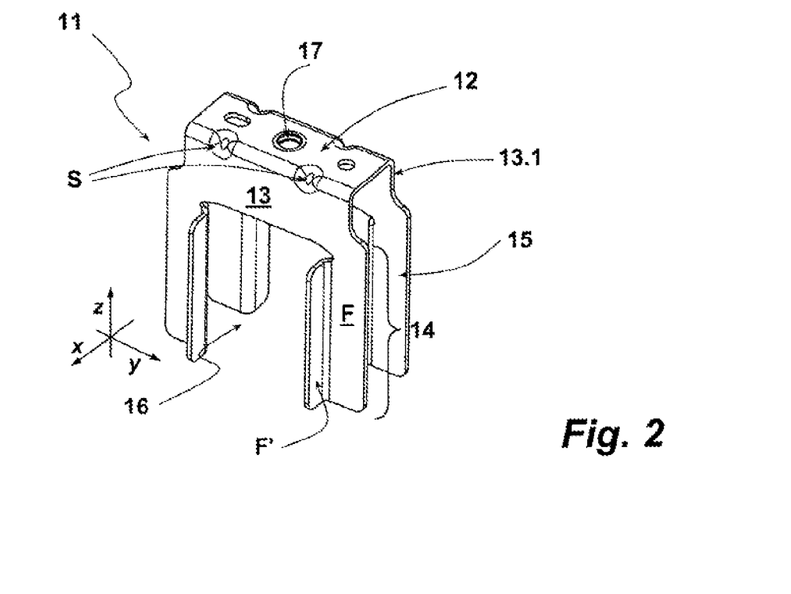
FIG. 2 shows a perspective view of a tolerance-compensating, shown in isolation.

The connecting plate 12 features auxiliary mounting openings. These serve the purpose of maintaining the tolerance-compensating element, for instance with a mounting support used for the mounting of the tolerance elements 11.

The aforementioned play is needed in this embodiment, since the connecting plate 12 supports a pierce nut 17 as a fastening element for attaching a cover to the housing part 1, for which reason the tolerance-compensating elements must be fastened to the housing part 1 in a precisely specified position.

For the longitudinal tolerance compensation of the transverse struts 9 with respect to the adjacent wall of the longitudinal strut 8, the connecting extensions 14 are designed as flanges F (see FIG. 2) in order to form the transverse strut seat 15. The width of the flanges F (extending in the y direction) is dimensioned such that the air gap L is bridged, and that an overlap with the side wall of the transverse struts 9 is provided, which is necessary for joining—in this case by spot welding.

In the embodiment shown, the longitudinal strut seat 6 of the tolerance-compensating elements 11 is also bordered by two flanges F'. The flanges F' are positioned at n angle to the flange F. In principle, this is not necessary. The mutually facing sides of the flanges F may also provide the longitudinal strut seat 16. The folding F' in the connecting extensions 14 not only increases stability, but also provides a joining flange that may, for instance, be connected by spot welding to the adjacent side wall of the longitudinal strut 8. In the embodiment of FIG. 2, the flanges F, F' run parallel to the side walls of the struts 8, 9 to be engaged in the respective strut seats 15, 16.

In order to prevent spring-back when folding the shanks 13, 13.1 from the connecting plate 12 while manufacturing the tolerance-compensating element 11, impact notches S or other forms of embossing are formed into the bending edges. This also increases rigidity.

Figure 3:
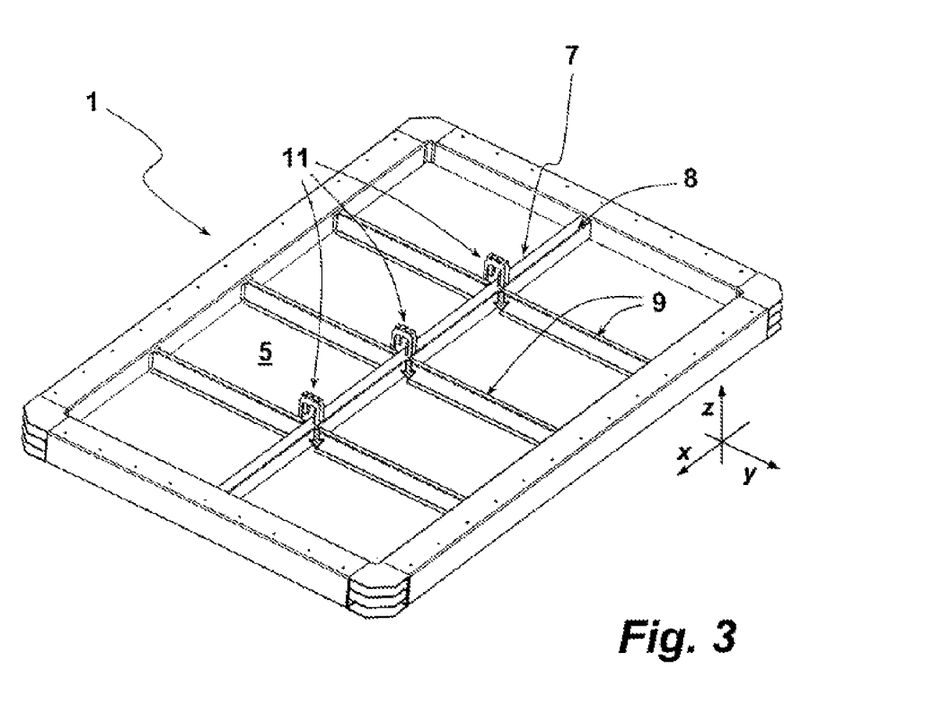
FIG. 3 shows the housing part of FIG. 1 with tolerance-compensating elements being inserted.

The three tolerance-compensating elements 11 may be mounted using a mounting support not shown in the figures, on which the tolerance-compensating elements 11 are arranged at their intended distance from one another. Attached to such a mounting support, the tolerance-compensating elements 11 are lowered for the formation of the node in the compartment structure 7, with a respective connecting extension 14 engaging a corner between the longitudinal strut 8 and the transverse strut 9, as shown schematically in FIG. 3. In the embodiment shown, the longitudinal strut 8 and the transverse struts 9 were previously fastened to the interior wall 10 of the frame 2, also by a welding process. The mounting support is positioned with respect to the frame 2 such that the pierce nuts 17 are in the desired position. This may involve utilization of the remaining play between the transverse strut 9 engaging a transverse strut seat 15 and the longitudinal strut 8 engaging the longitudinal strut seat 16. The length of the connecting extensions 14 is preferably dimensioned such that they do not reach the bottom plate 5. Therefore, with respect to the insertion height of the tolerance-compensating elements 11, there is also a certain amount of play available for the intended positioning. If the tolerance-compensating elements 11 are positioned as intended with respect to the frame 2 of the housing part 1, they are welded together with the longitudinal strut 8 and the transverse struts 9. The tolerance-compensating elements 11 are then detached from the mounting support. To that extent, the tolerance-compensating elements 11 are floated for the purposes of positioning and bonding to the compartment structure 7 that was already pre-fixated inside the range 2, and kept in this position until they are fixated with the remaining components of the compartment structure 7.

Figure 4:
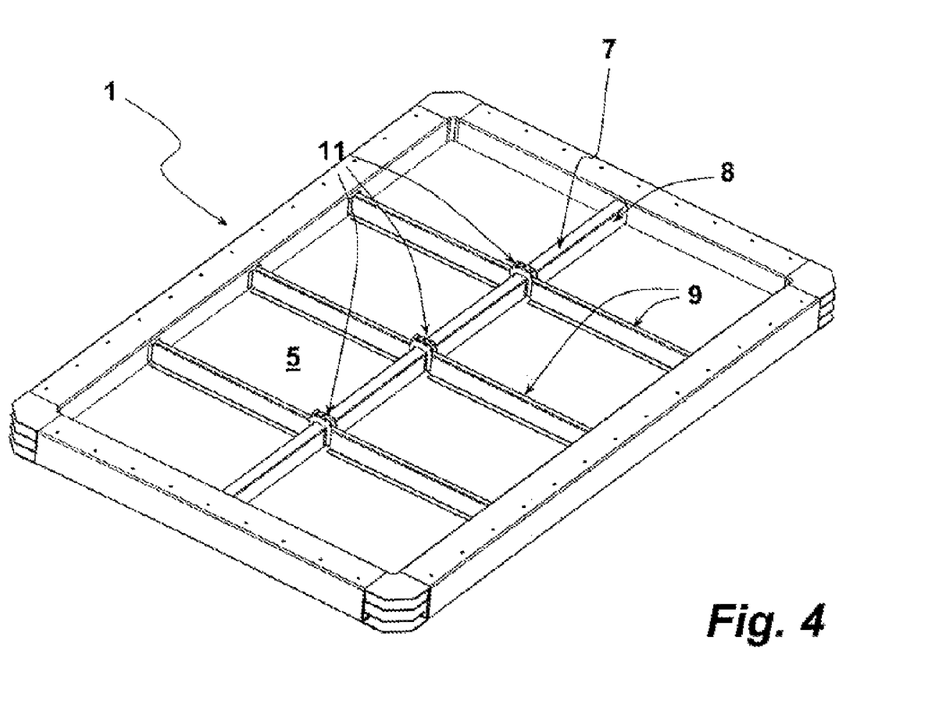
FIG. 4 shows the housing part of FIG. 3 with the inserted tolerance-compensating elements fixated by joining.

FIG. 4 shows the tolerance-compensating elements attached to the struts 8, 9. The tolerance-compensating elements 11 each form a node in the compartment structure 7, by way of which the longitudinal strut 8 is respectively connected with two mutually opposing transverse struts 9. The possible longitudinal compensation is defined by the width of the flanges F bordering the transverse strut seat 15 (the flanges extending in the longitudinal dimension of a transverse strut 9). The overlap of these flanges F with the side faces of the transverse struts 9 is dimensioned such that this overlap is sufficient for connection.

Figure 5:
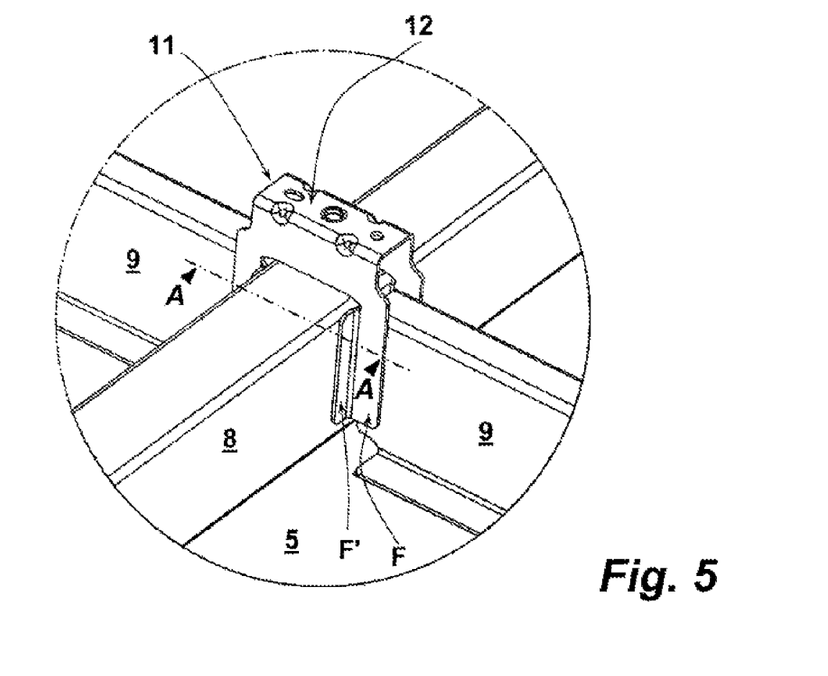
FIG. 5 shows an enlarged partial view of a tolerance-compensating element of FIG. 4.

In a detail enlargement, FIG. 5 shows a node of the compartment structure 7 with tolerance-compensating element 11 connecting the opposing transverse struts 9, which is attached to the longitudinal strut 8 by means of a flange positioned at an angle froth flange F.

Figure 6:
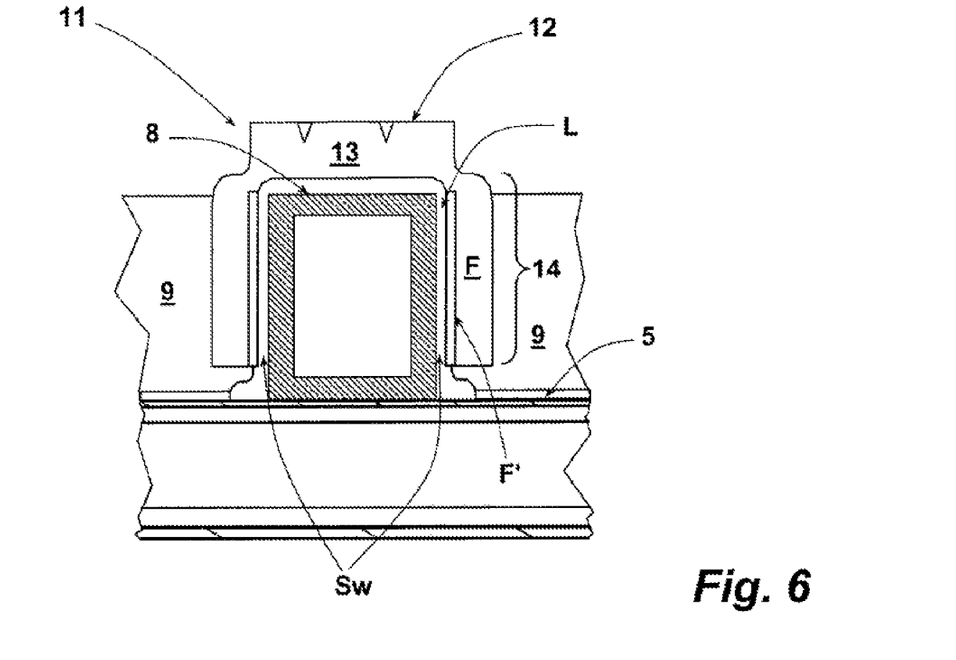
FIG. 6 shows a sectional view taken along line A-A of FIG. 5.

The aforementioned gap width Sw between the flanges F' and the strut 8 prior to joining the tolerance-compensating element 11 can be seen in the sectional view of FIG. 6. Similarly, a gap width between a transverse strut and the flanges F is provided. FIG. 6 also shows the air gap L between the front end of the transverse struts 9 facing the longitudinal strut 8 and the side wall of the longitudinal strut 8, as well as of the overlap of the flange F of the connecting extensions 14 with the side walls of the transverse struts 9.

Figure 7:
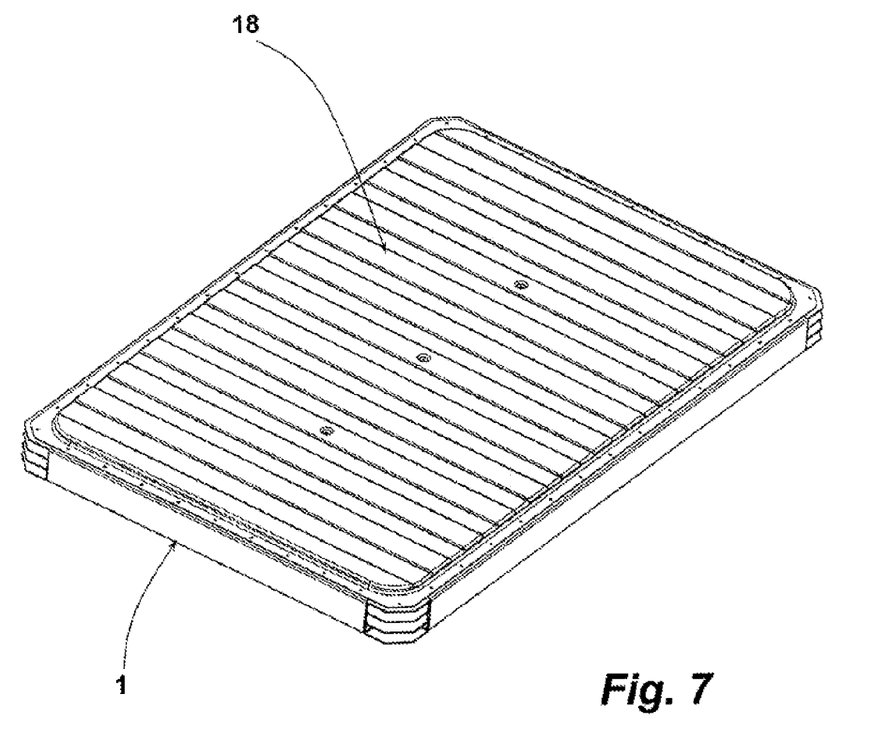
FIG. 7 shows a perspective view of the battery housing in which the housing part of FIG. 4 is locked with a cover.

Due to the aforementioned measures, the tolerance-compensating elements 11 are the compartment structure 7 with its longitudinal strut 8 and transverse struts 9 in a central position of the housing part 1. This is a preferred position for attaching a cover 18. A cover 18 is used to close the housing part 1, which cover 18 is positioned in FIG. 7 on the upper surface of the housing part 1 and attached to it by means of fastening screws engaging the pierce nuts 17 of the tolerance-compensating elements 11.

Figure 8:
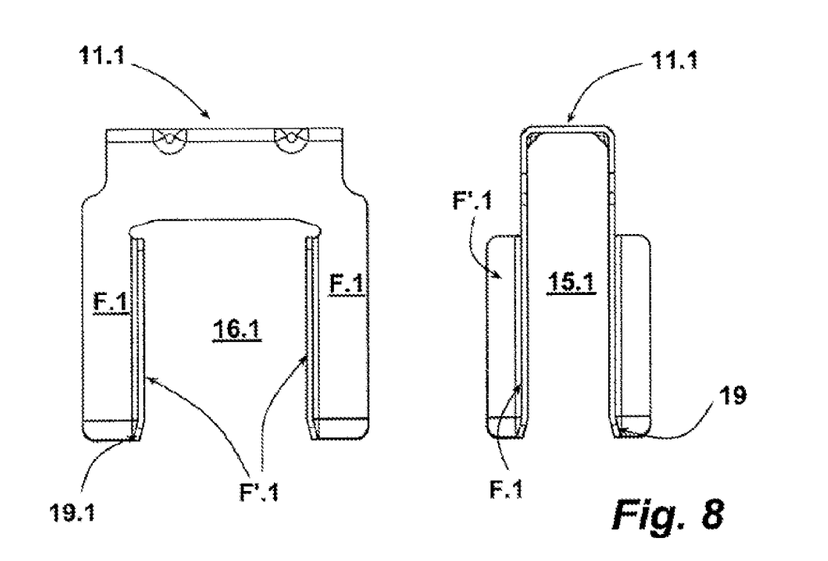
FIG. 8 shows a tolerance-compensating element according to an additional embodiment, in two side views.

FIG. 8 shows another tolerance-compensating element 11.1 in a side view facing its longitudinal strut seat 16.1 (left) and in a side view facing its transverse strut seat 15.1 (right). In principal, the tolerance-compensating element 11.1 is constructed like the tolerance-compensating element 11. The tolerance-compensating element 11.1 differs from that of the previous figures in that the flanges F.1, F'.1 are inclined by a few angle degrees with respect to the side wall of the longitudinal strut or of the transverse strut that is to be connected to the flanges. The converging incline of the flange F.1, F'.1 runs in the direction of the opening of the respective strut seats 15.1, 16.2, such that the width clearance between the two flanges F.1 or F'.1 bordering the respective strut seats 15.1 or 16.1 increases from the opening towards the center of the tolerance-compensating element 11.1. Due to their material, the flanges F.1, F'.1 are somewhat elastic in the direction of their incline. As a result, an air gap between the flanges F.1, F'.1 and a strut inserted into the respective strut seats 15.1 or 16.1 can be minimized or even avoided entirely, while maintaining the ability of a tolerance compensation in the x and y direction on the respective lateral face.

On their bottom surface, the flanges F.1 and F'.1 respectively feature a lead-in chamfer 19, 19.1, which facilitates the placement of the tolerance-compensating element 11.1 on the struts that are to be connected a longitudinal strut and two transverse struts by making it easier to find the corners between the struts. The tolerance-compensating elements 11 of FIGS. 1 through 7 may feature such lead-in chamfers as well.

Figure 9:
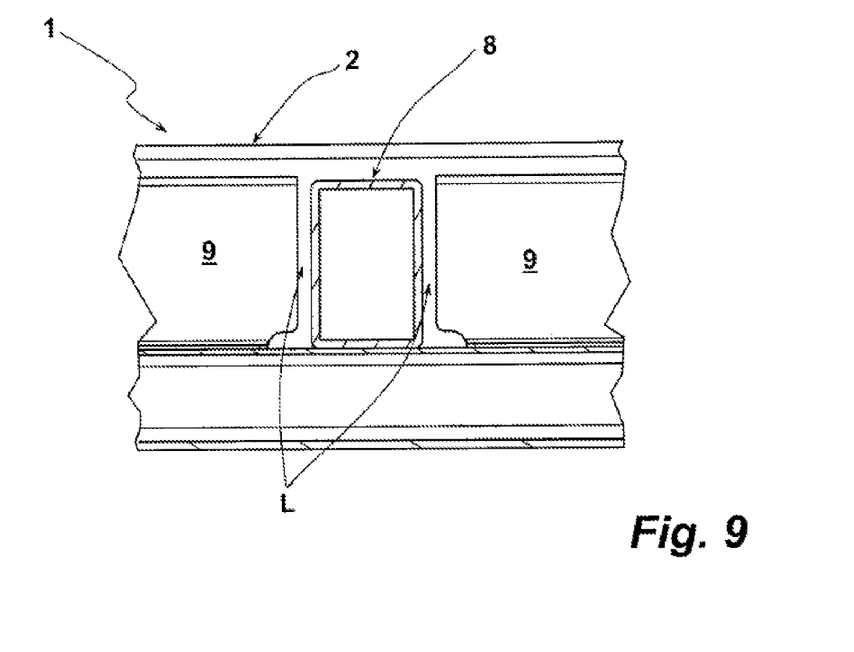
FIG. 9 shows a sectional view corresponding to that of FIG. 6 before the assembly of a tolerance-compensating element.

FIG. 9 shows a cross section through the housing part 1 and its longitudinal strut 8 in order to illustrate the arrangement of the longitudinal strut 8 and the transverse struts 9 prior to the fitting of a tolerance-compensating element. The air gap L between the end faces of the transverse struts 9 and the respective side wall of the longitudinal strut 8 can be clearly seen here.

Figure 10:
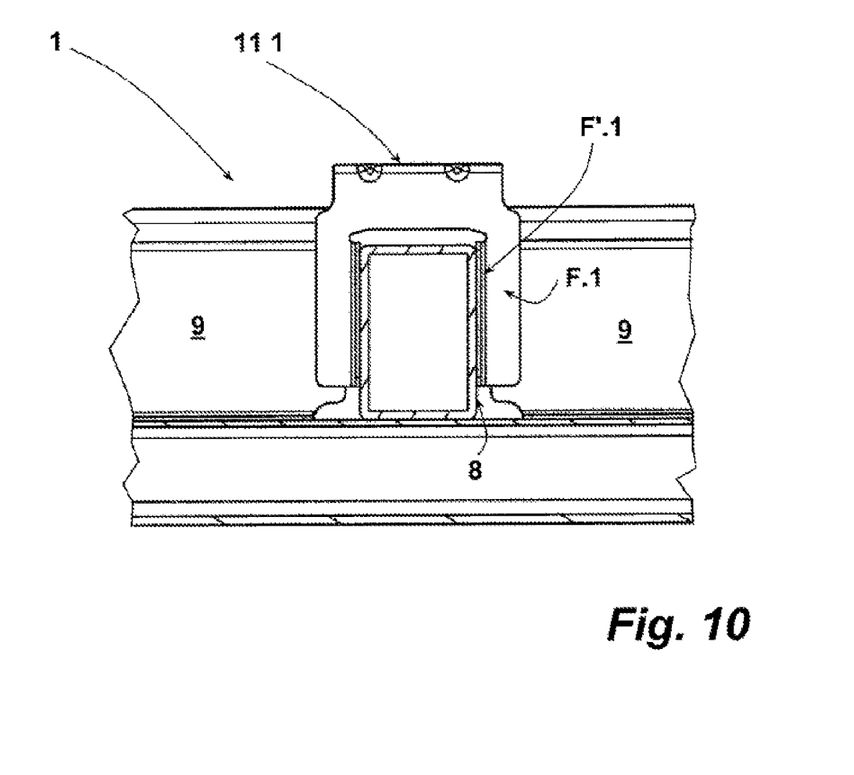
FIG. 10 shows the sectional view of FIG. 9 with an assembled tolerance-compensating element according to FIG. 8.

In this embodiment, the tolerance-compensating element 11.1 is mounted to form a node as shown in FIG. 10. The tolerance-compensating element 11.1 is positioned with its flanges F.1, F'.1 on the side walls of the struts 8, 9 without play. This illustration also clearly shows the bridging of the air gap L between the transverse struts 9 and the longitudinal strut 8 by the flanges F.1.

The compartment structure 7 of the trough-like structure 6 of the housing part 1 may also be produced in such a manner that the struts are first positioned accurately in the trough-like structure 6, after which the tolerance-compensating elements are mounted to form the nodes, and the connection of the struts to the peripheral wall is only done at the end, for instance by way of a joining process.

The invention has been described by way of example embodiments. Without departing from the scope of the applicable claims, a person skilled in the art will find apparent numerous other options and additional embodiments of implementing the invention within the scope of the applicable claims.

REFERENCE LIST

1 Housing part
2 Frame
3 Angle piece
4 Profile segment
5 Bottom plate
6 Trough-like structure
7 Compartment structure
8 Longitudinal strut
9 Transverse strut
10 Interior or peripheral wall
11 Tolerance-compensating element
12 Connecting plate
13, 13.1 Shanks
14 Connecting extension
15, 15.1 Transverse strut seat
16, 16.1 Longitudinal strut seat
17 Pierce nut
18 Cover
19, 19.1 Lead-in chamfer
F, F', F.1, F'.1 Flange
L Air gap
S Impact notches
Sw Gap width

The invention claimed is:

1. A battery housing for a vehicle driven by an electric motor, comprising:
a housing part and a cover part which closes the housing part, wherein a trough-like structure of the housing part is formed by an interior wall and a base interconnecting the interior wall,
a compartment structure, formed by at least one longitudinal strut and at least one transverse strut, for holding battery modules inserted into the trough-like structure, wherein the compartment structure comprises one or more tolerance-compensating elements for compensating tolerances of the struts and/or of internal dimensions of the trough-like structure,
wherein a tolerance-compensating element is involved in a node formation between a longitudinal strut and at least one transverse strut, the tolerance-compensating element having a longitudinal strut seat and a transverse strut seat, and each of the longitudinal strut seat and the transverse strut seat are bordered by two connecting extensions of the tolerance-compensating element mutually spaced apart from one another,
wherein each of the connecting extensions engages a corner of the node between the transverse strut and the longitudinal strut, said connecting extensions formed on a connecting plate which acts as a cover support element for the cover part, and each of the connecting extensions are connected to a lateral face of the longitudinal strut and to a lateral face of a transverse strut by a joining process.

2. The battery housing of claim 1, wherein multiple transverse struts are arranged at a distance with respect to one another along the longitudinal dimension of the longitudinal strut.

3. The battery housing of claim 1, wherein one longitudinal strut and two transverse struts opposite each other with respect to the longitudinal axis of said longitudinal strut are involved in the node formation.

4. The battery housing of claim 1, wherein an air gap is provided between end faces of transverse struts facing the longitudinal strut and respective lateral faces of the longitudinal strut.

5. The battery housing of claim 4, wherein the transverse struts abut the interior wall of the trough-like structure, or an additional longitudinal strut extending parallel to the first longitudinal strut with their end faces facing the longitudinal struts and are attached thereto.

6. The battery housing of claim 1, wherein the at least one longitudinal strut is attached to the interior wall of the trough-like structure at one end only with an intermediary length compensation element.

7. The battery housing of claim 1, wherein the connecting plates of the tolerance-compensating elements are all cover support elements for supporting the cover part.

8. The battery housing of claim 7, wherein the connecting plates of the tolerance-compensating elements are cover connecting plates for connecting the cover part.

9. The battery housing of claim 8, wherein the connecting plate carries a fastening element for securing the cover part to the tolerance-compensating element.

10. The battery housing of claim 1, wherein parts of the connecting extensions bordering the transverse strut seat are provided as flanges.

11. The battery housing of claim 10, wherein parts of the connecting extensions bordering the longitudinal strut seat are provided as flanges positioned at an angle relative to the flanges bordering the transverse strut seat.

12. The battery housing of claim 1, wherein the connecting plate has two shanks positioned at an angle to a plane of the connecting plate, and the connecting extensions are formed on said shanks.

13. The battery housing of claim 1, wherein a maximum width clearance of the longitudinal strut seat and that of the transverse strut seat is larger than a width of the respective longitudinal or transverse strut engaged therein.

14. The battery housing of claim 13, wherein the at least one longitudinal strut and the at least one transverse strut are parts made out of metal, and a maximum gap width between the connecting extensions and lateral faces of the struts inserted into the strut seats bordered by the connecting extensions is such that the connecting extensions and the struts can be coupled together in a joining process.

15. A method using a tolerance-compensating element for node formation between a longitudinal strut and at least one transverse strut of a compartment structure of a battery housing for a vehicle driven by an electric motor, comprising:
positioning the tolerance-compensating element on the longitudinal strut and the at least one transverse strut, the tolerance-compensating element having a connecting plate that acts as a battery housing cover support element, as well as connecting extensions extending in a plane transverse to a plane of the connecting plate, wherein a longitudinal strut seat and a transverse strut seat are each respectively provided by two connecting extensions that are mutually spaced from one another, and
connecting said connecting extensions of the tolerance-compensating element respectively to a lateral face of the longitudinal strut and to a lateral face of a transverse strut by a joining process.

16. The method of claim 15, wherein parts of the connecting extensions bordering the transverse strut seat are provided as flanges.

17. The method of claim 16, wherein parts of the connecting extensions bordering the longitudinal strut seat are provided as flanges positioned at an angle relative to the flanges bordering the transverse strut seat.

18. The method of claim 17, wherein the flanges bordering the strut seats are inclined at an angle relative to the respective adjoining lateral face of the longitudinal strut or of the transverse strut.

19. The method of claim 15, wherein the connecting plate carries a fastening element for securing a battery housing cover to the tolerance-compensating element.

20. The method of claim 15, wherein the connecting plate has auxiliary mounting openings.

21. The method of claim 15, wherein the connecting extensions are formed on shanks positioned at an angle to the plane of the connecting plate.

* * * * *